No 770,039. Patented September 13, 1904.

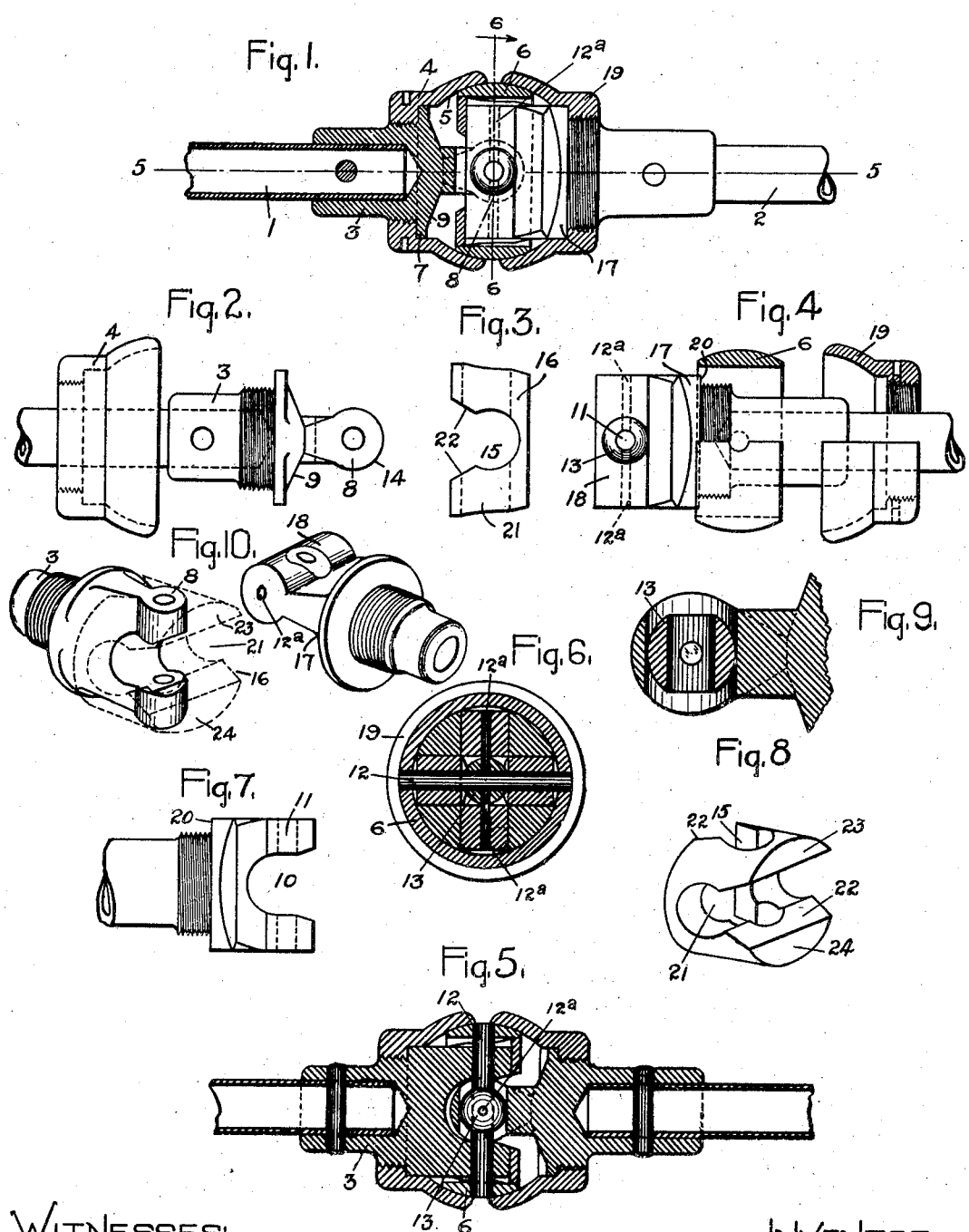

UNITED STATES PATENT OFFICE.

AUGUSTUS A. BALL, JR., OF LYNN, MASSACHUSETTS, ASSIGNOR, BY MESNE ASSIGNMENTS, TO GENERAL ELECTRIC COMPANY, A CORPORATION OF NEW YORK.

SHAFT-COUPLING.

SPECIFICATION forming part of Letters Patent No. 770,039, dated September 13, 1904.

Application filed January 28, 1903. Serial No. 140,892. (No model.)

*To all whom it may concern:*

Be it known that I, AUGUSTUS A. BALL, Jr., a citizen of the United States, residing at Lynn, in the county of Essex, State of Massachusetts, have invented certain new and useful Improvements in Shaft-Couplings, of which the following is a specification.

The present invention relates to universal couplings, and has for its object to provide a coupling which is simple and strong in construction and has large bearing-surfaces that reduce the wear to a minimum.

For a consideration as to what I consider to be novel and of my invention attention is called to the accompanying description and the claims appended thereto.

In the drawings, which represent an embodiment of my invention, Figure 1 is a longitudinal section of a universal coupling with certain of the parts in elevation. Figs. 2, 3, and 4 represent in elevation the parts of the coupling before they are assembled. Fig. 5 is a longitudinal section taken on line 5 5 of Fig. 1. Fig. 6 is a cross-section of the structure shown in Fig. 1, taken on line 6 6 looking in the direction of the arrow. Fig. 7 is a side elevation of one of the heads or principal members of the coupling. Fig. 8 is a perspective view of the locking device which unites the two heads that are secured to the adjacent ends of the shafts. Fig. 9 is an enlarged sectional view showing the ball which supports the intermediate portion of the retaining-pin, and Fig. 10 is a perspective view illustrating the coupling-heads in full lines and the locking-piece in dotted lines.

1 represents a shaft which may be either solid or tubular, as desired, and 2 represents a second shaft of the same or different character that is designed to be united with the first by a universal coupling. Mounted on the end of the shaft 1 is a head 3, comprising a sleeve-like portion that is rigidly connected to the shaft by a pin or other means and an enlargement which enters a locking-piece to be hereinafter referred to. The sleeve is threaded externally to receive the detachable cup-shaped piece or casing 4. This last-mentioned piece acts as a dust-guard to prevent the entrance of foreign matter into the interior of the coupling. It also serves to retain oil or other lubricating medium. The inner face 5 of said cup-shaped piece is spherical and is arranged to engage with the outer surface of the retaining-band 6. The bearing-surfaces of the parts 5 and 6 have the same center of motion as that of the coupling. Formed on the head 3 is a shoulder 7, against which the cup-shaped piece is seated. The head is provided with a projection 8, having a cylindrical wearing-surface, and between the projection and the shoulder 7 is a bevel-surface 9. The object in beveling this surface and also the head 3 is to furnish room in which the locking-piece and other parts of the coupling can move when the parts of the shaft are rotated and the centers of motion are at an angle to each other. The projection 8 is provided with a central opening 10, Fig. 7, which is arranged to receive the projection on the head that is connected to the other portion of the shaft. The walls of the opening do not, however, make frictional contact with the projection except where the pin for the retaining-band passes through them. The projection is provided with an opening 11, that is designed to receive the pin 12, the latter being employed to secure the retaining-band 6 and the ball 13 in place. This ball serves to support the pin between the point where it leaves one side of the forked projection 8 and enters the other. Being in line with the center of rotation of one shaft and in frictional engagement with the walls of the projection on the second head, any longitudinal thrust exerted by the shafts will in part be received by the ball. In order to hold the ball in place when the coupling is taken down, small pins $12^a$ are employed, which pass through the forked arms of the head on the shaft 2. The centers of the pins $12^a$, if extended, would pass through the center of the pin 12.

It is to be noted that the projection 8 is provided with a cylindrical surface 14, which surface is of considerable area to decrease the wear and is designed to be fitted into a corresponding opening 15 in the detachable locking-piece 16, to be described later on.

On the end of the shaft 2 is a head 17, which corresponds closely to the head 3, except that it is provided with a cylindrical opening to receive the ball 13 instead of being slotted. The head is provided with a sleeve which is rigidly attached to the shaft, and the periphery is screw-threaded to receive the cup-shaped cap or casing 19. The latter is arranged to be seated against the shoulder 20 of the head and is provided with a spherical surface which engages with the retaining-band 6. The projection 18 is provided with a surface which forms a part of a cylinder. This portion of the projection is designed to be seated in the opening 21, that is formed in the locking-piece 16.

Referring to Fig. 8, the construction of the locking-piece will be described. It comprises a single piece of metal having cylindrical slots or openings 15 and 21, that are located at right angles to each other. One of the openings is designed to receive the projection that is attached to one shaft, the other being designed to receive the projection that is attached to the other shaft. The locking-piece is chamfered, as at 22, in order to permit the shafts 1 and 2 to revolve at an angle to each other. The coupling shown is capable of working only through a relatively limited angle. This angle is determined by the space between the projections on the heads and the surfaces 22 and also by the space between the ends of the inclosing caps 4 and 19. The greater these spaces the greater will be the permissible angular relation between the two shafts. It is to be noted that the walls of the locking-piece inclose a little more than half of each of the cylindrical projections on the heads, which is sufficient to prevent independent longitudinal movement and to maintain the parts in proper relation, providing the locking-piece does not spread. Any tendency to spread is resisted by the retaining-band 6, which can be made as strong as is desired. The band may be made thicker to resist additional strain, if desired; but it will not interfere with the permissible degree of angular relation of the shafts. By reason of the enlarged bearing-surfaces the tendency of the heads to have angular movement independent of each other is reduced to a minimum.

In Fig. 10 the relation of the parts is clearly disclosed. The projection 8 extends vertically, while the projection 18 extends horizontally, each overlapping the other. The locking-piece is shown in position on the projection 8 by dotted lines, and the opening 21 is in position to receive the cylindrical projection 18.

In assembling the parts the locking-piece 16 is slipped over the projection 8 of the head 3, and owing to the fact that the projection has a cylindrical enlargement which fits into the opening 15 it cannot be separated therefrom longitudinally. The next step is to insert the ball 13 in position in the projection 18 and secure it by the pins 12ª, after which the projection is inserted into the opening 21, Fig. 8, by a lateral movement, and by reason of the cylindrical enlargement, which makes a close working fit with the locking-piece, it cannot be removed therefrom by any longitudinal movement of the shaft. The next step is to slip the retaining-band 6 over the locking-piece and insert the pin 12. The latter serves to prevent the retaining-band from moving longitudinally and is supported at the center by the ball 13. The outer surface of the retaining-band is spherical for engagement with the inclosing caps or casings 4 and 19, and its inner surface is cylindrical for engagement with the locking-piece and the ends of the projections 8 and 18. From the foregoing it will be noted that the strain of the parts is principally on the retaining-band, because the latter prevents any tendency of the ends 23 and 24 of the locking-piece to spread or separate and permits the projection 18 to move longitudinally.

It will be seen that the two parts of the coupling have the same center of motion, which is an important feature.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a coupling, the combination of a pair of shafts, a head for each shaft that is provided with a projection, a locking-piece which engages with and holds the projections in definite relation with respect to each other and prevents independent longitudinal movement of the shafts, and a retaining-band which surrounds and engages the projections and the locking-piece.

2. In a coupling, the combination of a pair of shafts, a head for each shaft that is provided with a projection, a locking-piece which engages with and holds the projections in definite relation with respect to each other and prevents independent longitudinal movement of the shafts, a retaining-band which surrounds the projections and the locking-piece, and a pin which passes through the retaining-band and one of the projections.

3. In a coupling, the combination of a pair of shafts, a head for each shaft having a projection formed integral therewith and provided with a cylindrical outside bearing-surface, a locking-piece having two cylindrical openings located at an angle to each other, the walls of which surround and closely engage the cylindrical surfaces on the heads, and prevent them from separating.

4. In a coupling, the combination of a pair of heads each having a cylindrical projection, a locking-piece having openings which register with and fit the projections, a retaining-band having cylindrical and spherical surfaces which engage respectively with the locking-piece and the inclosing caps, inclosing caps which have a spherical inner surface, and a pin which passes through the retaining-band and a projection.

5. In a coupling, the combination of a pair of heads each having a projection formed integral therewith, the projections overlapping and occupying positions at right angles to each other, a locking device which engages the projections and secures them together, a retaining-band, a ball, and a pin which passes through the projections and ball for securing the band in place.

6. In a coupling, the combination of a pair of heads having projections formed integral therewith, a locking device having slots which register with the projections, a retaining-band, a pin which passes through the retaining-band and projections, and a ball which is carried by one of the projections and supports the intermediate portion of the pin.

7. In a coupling, the combination of a pair of heads having projections formed integral therewith, and a locking-piece having cylindrical openings which register with the projections, the openings having chamfered sides to allow a limited angular displacement of each shaft.

8. In a coupling, the combination of a pair of heads each having an exterior screw-thread and a shoulder formed thereon, screw-threaded cup-shaped pieces which are seated on the shoulders and have spherical bearing-surfaces, and a retaining-band for securing the projections together which is provided with a spherical surface that engages with the corresponding surfaces on the cup-shaped pieces.

In witness whereof I have hereunto set my hand this 26th day of January, 1903.

AUGUSTUS A. BALL, JR.

Witnesses:
DUGALD McK. McKILLOP,
JOHN A. McMANUS.